US008259676B2

(12) United States Patent
Leung et al.

(10) Patent No.: US 8,259,676 B2
(45) Date of Patent: *Sep. 4, 2012

(54) METHODS AND APPARATUS FOR SECURING PROXY MOBILE IP

(75) Inventors: Kent K. Leung, Mountain View, CA (US); Gopal Dommety, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 520 days.

This patent is subject to a terminal disclaimer.

(21) Appl. No.: 12/368,159

(22) Filed: Feb. 9, 2009

(65) Prior Publication Data

US 2009/0141688 A1  Jun. 4, 2009

Related U.S. Application Data

(62) Division of application No. 10/426,106, filed on Apr. 28, 2003, now Pat. No. 7,505,432.

(51) Int. Cl.
*H04Q 7/00* (2006.01)

(52) U.S. Cl. ...................... 370/331; 370/338; 370/395.3; 370/395.52; 455/433; 455/436; 455/435.1; 709/227; 709/238

(58) Field of Classification Search ........................ None
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey et al. | |
| 5,018,133 A | 5/1991 | Tsukakoshi et al. | |
| 5,218,600 A | 6/1993 | Schenkyr et al. | |
| 5,276,680 A | 1/1994 | Messenger | |
| 5,371,852 A | 12/1994 | Attanasio et al. | |

(Continued)

FOREIGN PATENT DOCUMENTS

EP  0924913 A1  6/1999

(Continued)

OTHER PUBLICATIONS

Canadian Office Action mailed Aug. 6, 2010 from related CA Application No. 2,520,501.

(Continued)

*Primary Examiner* — Chi H. Pham
*Assistant Examiner* — Shick Hom
(74) *Attorney, Agent, or Firm* — Weaver Austin Villeneuve & Sampson LLP

(57) ABSTRACT

Various security mechanisms may be used independently, or in combination with one another, to authenticate the identity of a node during the Mobile IP registration process. First, an Access Point receiving a packet from a node verifies that the source MAC address identified in the packet is in the Access Point's client association table. In addition, as a second mechanism, the Access Point ensures that a one-to-one mapping exists for the source MAC address and source IP address identified in the packet in a mapping table maintained by the Access Point. As a third mechanism, a binding is not modified in the mobility binding table maintained by the Home Agent unless there is a one-to-one mapping in the mobility binding table between the source MAC address and the source IP address. Similarly, the Foreign Agent may also maintain a mapping between the source IP address and the source MAC address in its visitor table to ensure a one-to-one mapping between a source IP address and the associated MAC address.

24 Claims, 7 Drawing Sheets

U.S. PATENT DOCUMENTS

| | | | |
|---|---|---|---|
| 5,473,599 A | 12/1995 | Li et al. | |
| 5,490,139 A | 2/1996 | Baker et al. | |
| 5,570,366 A | 10/1996 | Baker et al. | |
| 5,572,528 A | 11/1996 | Shuen | |
| 5,619,552 A | 4/1997 | Karppanen et al. | |
| 5,729,537 A | 3/1998 | Billstrom | |
| 5,751,799 A | 5/1998 | Mori | |
| 5,805,702 A | 9/1998 | Curry et al. | |
| 5,825,759 A | 10/1998 | Liu | |
| 5,862,345 A | 1/1999 | Okanoue et al. | |
| 5,978,672 A | 11/1999 | Hartmaier et al. | |
| 6,016,428 A | 1/2000 | Diachina et al. | |
| 6,055,236 A | 4/2000 | Nessett et al. | |
| 6,061,650 A | 5/2000 | Malkin et al. | |
| 6,075,783 A | 6/2000 | Voit | |
| 6,078,575 A | 6/2000 | Dommety et al. | |
| 6,079,020 A | 6/2000 | Liu | |
| 6,081,507 A | 6/2000 | Chao et al. | |
| 6,122,268 A | 9/2000 | Okanoue et al. | |
| 6,131,095 A | 10/2000 | Low et al. | |
| 6,137,791 A | 10/2000 | Frid et al. | |
| 6,144,671 A | 11/2000 | Perinpanathan et al. | |
| 6,154,839 A | 11/2000 | Arrow et al. | |
| 6,163,843 A | 12/2000 | Inoue et al. | |
| 6,167,513 A | 12/2000 | Inoue et al. | |
| 6,172,986 B1 | 1/2001 | Watanuki et al. | |
| 6,173,399 B1 | 1/2001 | Gilbrech | |
| 6,175,917 B1 | 1/2001 | Arrow et al. | |
| 6,195,705 B1 | 2/2001 | Leung | |
| 6,226,748 B1 | 5/2001 | Bots et al. | |
| 6,226,751 B1 | 5/2001 | Arrow et al. | |
| 6,230,012 B1 | 5/2001 | Wilkie et al. | |
| 6,240,089 B1 | 5/2001 | Okanoue et al. | |
| 6,256,300 B1 | 7/2001 | Ahmed et al. | |
| 6,272,129 B1 | 8/2001 | Dynarski et al. | |
| 6,308,267 B1 | 10/2001 | Greemmelmaier | |
| 6,339,830 B1 | 1/2002 | See et al. | |
| 6,377,982 B1 | 4/2002 | Rai et al. | |
| 6,393,482 B1 | 5/2002 | Rai et al. | |
| 6,396,828 B1 | 5/2002 | Liu | |
| 6,400,722 B1 | 6/2002 | Chuah et al. | |
| 6,445,922 B1 | 9/2002 | Hiller et al. | |
| 6,452,920 B1 | 9/2002 | Comstock | |
| 6,466,964 B1 | 10/2002 | Leung et al. | |
| 6,473,413 B1 | 10/2002 | Chiou et al. | |
| 6,487,406 B1 | 11/2002 | Chang et al. | 455/422.1 |
| 6,496,491 B2 | 12/2002 | Chuah et al. | |
| 6,496,855 B1 | 12/2002 | Hunt et al. | |
| 6,501,746 B1 | 12/2002 | Leung | 370/338 |
| 6,510,144 B1 | 1/2003 | Dommety et al. | |
| 6,515,974 B1 | 2/2003 | Inoue et al. | |
| 6,522,880 B1 | 2/2003 | Verma et al. | |
| 6,535,493 B1 | 3/2003 | Lee et al. | |
| 6,571,289 B1 * | 5/2003 | Montenegro | 709/227 |
| 6,577,643 B1 | 6/2003 | Rai et al. | |
| 6,578,085 B1 | 6/2003 | Khalil et al. | |
| 6,587,882 B1 | 7/2003 | Inoue et al. | |
| 6,597,882 B1 | 7/2003 | Tanaka | |
| 6,625,135 B1 | 9/2003 | Johnson et al. | |
| 6,651,105 B1 | 11/2003 | Bhagwat et al. | |
| 6,657,981 B1 | 12/2003 | Lee et al. | |
| 6,665,537 B1 | 12/2003 | Lioy | |
| 6,675,208 B1 | 1/2004 | Rai et al. | |
| 6,683,871 B1 | 1/2004 | Lee et al. | |
| 6,684,241 B1 | 1/2004 | Sandick et al. | |
| 6,701,437 B1 | 3/2004 | Hoke et al. | |
| 6,707,809 B1 | 3/2004 | Warrier et al. | |
| 6,731,621 B1 | 5/2004 | Mizutani et al. | 370/338 |
| 6,742,036 B1 | 5/2004 | Das et al. | |
| 6,760,444 B1 | 7/2004 | Leung | |
| 6,763,007 B1 | 7/2004 | La Porta et al. | |
| 6,795,857 B1 | 9/2004 | Leung et al. | |
| 6,810,259 B1 | 10/2004 | Zhang | |
| 6,947,401 B2 | 9/2005 | El-Malki et al. | |
| 6,973,068 B2 | 12/2005 | Inoue et al. | |
| 6,982,967 B1 | 1/2006 | Leung | |
| 6,992,994 B2 | 1/2006 | Das et al. | |
| 6,992,995 B2 | 1/2006 | Agrawal et al. | |
| 6,996,084 B2 | 2/2006 | Troxel et al. | |
| 7,068,640 B2 | 6/2006 | Kakemizu et al. | |
| 7,079,499 B1 | 7/2006 | Akhtar et al. | |
| 7,079,520 B2 | 7/2006 | Feige et al. | |
| 7,080,151 B1 | 7/2006 | Borella et al. | |
| 7,096,273 B1 | 8/2006 | Meier | 709/236 |
| 7,130,629 B1 | 10/2006 | Leung et al. | |
| 7,134,012 B2 | 11/2006 | Doyle et al. | |
| 7,139,833 B2 * | 11/2006 | Heller | 709/238 |
| 7,152,238 B1 | 12/2006 | Leung et al. | |
| 7,161,913 B2 | 1/2007 | Jung | |
| 7,170,892 B2 | 1/2007 | Major | |
| 7,216,159 B2 | 5/2007 | Hirose et al. | |
| 7,236,469 B2 | 6/2007 | Yokota et al. | |
| 7,260,638 B2 | 8/2007 | Crosbie | |
| 7,289,631 B2 | 10/2007 | Ishidoshiro | |
| 7,339,903 B2 | 3/2008 | O'Neil | |
| 7,339,928 B2 * | 3/2008 | Choyi et al. | 370/390 |
| 7,362,742 B1 | 4/2008 | Siddiqi et al. | |
| 7,428,226 B2 | 9/2008 | Adrangi et al. | 370/331 |
| 7,447,188 B1 | 11/2008 | Dommety et al. | |
| 7,457,289 B2 | 11/2008 | Wang | |
| 7,471,661 B1 | 12/2008 | Wang et al. | |
| 7,505,432 B2 * | 3/2009 | Leung et al. | 370/331 |
| 2001/0005369 A1 | 6/2001 | Kloth | |
| 2001/0036184 A1 | 11/2001 | Kinoshita et al. | |
| 2002/0021689 A1 | 2/2002 | Robbins | 370/352 |
| 2002/0075866 A1 | 6/2002 | Troxel et al. | |
| 2002/0078238 A1 | 6/2002 | Troxel et al. | |
| 2002/0080752 A1 | 6/2002 | Johansson et al. | |
| 2002/0147837 A1 | 10/2002 | Heller | |
| 2002/0188562 A1 * | 12/2002 | Igarashi et al. | 705/40 |
| 2003/0021275 A1 | 1/2003 | Shabeer | |
| 2003/0212794 A1 * | 11/2003 | Touati et al. | 709/226 |
| 2004/0001513 A1 | 1/2004 | Major et al. | |
| 2004/0024901 A1 | 2/2004 | Agrawal et al. | 709/238 |
| 2004/0081086 A1 | 4/2004 | Hippelainen et al. | |
| 2004/0103282 A1 | 5/2004 | Meier et al. | |
| 2004/0109452 A1 | 6/2004 | Takihiro et al. | |
| 2004/0114559 A1 | 6/2004 | Wang | |
| 2004/0208187 A1 | 10/2004 | Mizell et al. | |
| 2004/0213172 A1 | 10/2004 | Myers et al. | |
| 2004/0213260 A1 | 10/2004 | Leung et al. | |
| 2006/0203804 A1 | 9/2006 | Whitmore et al. | |
| 2009/0080399 A1 | 3/2009 | Wang et al. | 370/338 |

FOREIGN PATENT DOCUMENTS

| | | |
|---|---|---|
| EP | 0978977 A1 | 2/2000 |
| EP | 1124396 A2 | 8/2001 |

OTHER PUBLICATIONS

Chinese Office Action mailed Aug. 12, 2010 from related CN Application No. 200480010365.7.

European Office Action mailed Jun. 14, 2010 from related EP Application No. 04750992.2.

European Office Action mailed Aug. 19, 2010 from related EP Application No. 04750992.2.

Release notes for 3Com Corporation, "Conducting a Redundant Route for Network Resiliency," Mar. 1994, NET Builder Family Bridge/Router pp. 26-29.

Uyless Black, "TCP/IP and Related Protocols," 1992, McGraw-Hill, Inc., pp. 226-249.

T. Li et al., RFC 2281 "Cisco Hot Standby Router Protocol (HSRP)," Mar. 1998.

Chambless et al., "Home Agent Redundancy Protocol (HARP)," Oct. 27, 1997.

Network Working Group, RFC 2002 "IP Mobility Support," Oct. 1996, 80 pgs.

"Mobile IP," Release 12.0(1)T, pp. 1-55 on or before Jul. 25, 2002.

Montenegro, G., "Reverse Tunneling for Mobile IP," RFC 2344, Sun Microsystems, Inc. pp. 1-19, May 1998.

D. Harkins and D. Carrel, "The Internet Key Exchange (IKE)," Cisco Systems, pp. 1-33, Jun. 1998.

D. Cong, M. Hamlen, and C. Perkins, "The Definitions of Managed Objects for IP Mobility Support using SMIv2," RFC2006, Motorola and IBM, pp. 1-52, Oct. 1996.

J. Moy, RFC 1247 "OSPF Version 2," Jul. 19, 1991.
D. Oran, RFC 1142 "OSI IS-IS Intra-domain Routing Protocol," Feb. 1990.
C. Finseth, "An Access Control Protocol, Sometimes Called TACACS," RFC 1492, pp. 1-15, Sep. 13, 1992.
D. Carrel and Lol Grant, "The TACACS+ Protocol," Network Working Group, Internet-Draft, Cisco Systems, pp. 1-42, Jan. 1997.
C. Rigney, "RADIUS Accounting," RFC 2139, Livingston, pp. 1-25, Apr. 1997.
C. Rigney et al., "Remote Authentication Dial in User Service (RADIUS)," RFC 2138, pp. 1-65 Apr. 1997.
Charles Perkins, "Mobile IP Design Principles and Practices", Addison Wesley, 1998, pp. 50, 55-59, 83, 78.
R. Droms, "Dynamic Host Configuration Protocol", RFC 2131, Mar. 1997, pp. 1-39.
Helmy et al., "Efficient Micro-Mobility using Intra-Domain Multicast-Based Mechanisms (M&M)", ACM SIGCOMM Computer Communications Review, vol. 32, No. 5: Nov. 2002, pp. 61-72, XP-002279254.
Calhoun and Perkins, "Mobile IP Network Access Identifier Extension for IPv4", Jan. 12, 2000.
J. Postel, "Simple Mail Transfer Protocol", STD 10, RFC 821, Aug. 1982.
D. Crocker and P. Overrell, "Augmented BNF for Syntax Specifications: ABNF", RFC 2234, Nov. 1997.
Perkins & Hobby, Network Working Group, RFC 1172 "The Point-to-Point Protocol (PPP) Initial Configuration Options", Jul. 1990.
International Search Report mailed May 21, 2004 in related PCT Application No. PCT/US03/38568, 4 pgs.
International Search Report mailed Oct. 5, 2004 in related PCT Application No. PCT/US04/013365, 7 pgs.
B. Adoba et al., "The Network Access Identifier," Network Working Group, RFC 2486 Jan. 1999.
W. Simpson, Network Working Group, RFC 1994 PPP Challenge Handshake Authentication Protocol (CHAP), Aug. 1996.
Lloyd et al., Network Working Group, RFC 1334 "PPP Authentication Protocols", Oct. 1992.
McGregor, Network Working Group, RFC 1332 "The PPP Internet Control Protocol (IPCP)," May 1992.
Simpson, ed., Network Working Group, RFC 1661, "The Point-to-Point Protocol (PPP)", Jul. 1994.
U.S. Office Action dated Dec. 15, 2006 from related U.S. Appl. No. 10/321,080, 11 pgs.
U.S. Office Action dated Jul. 3, 2007 from related U.S. Appl. No. 10/321,080, 11 pgs.
U.S. Office Action mailed Jan. 25, 2007 from related U.S. Appl. No. 10/354,690, 26 pgs.
U.S. Office Action mailed Jul. 3, 2007 from related U.S. Appl. No. 10/354,690, 18 pgs.
Mobile Networking Through Mobile IP, Perkins, IEEE 1998.
U.S. Office Action dated Apr. 17, 2007 from related U.S. Appl. No. 10/426,106, 9 pgs.
U.S. Office Action dated Jun. 15, 2007 from related U.S. Appl. No. 10/426,106, 13 pgs.
U.S. Office Action dated Jun. 4, 2007 from related U.S. Appl. No. 10/874,679, 14 pgs.
U.S. Office Action dated Nov. 28, 2007 from related U.S. Appl. No. 10/874,679, 16 pgs.
Notice of Allowance and Allowed Claims dated Nov. 29, 2007 from U.S. Appl. No. 10/354,690, 16 pgs.
U.S. Office Action dated Dec. 12, 2007 from related U.S. Appl. No. 10/321,080, 10 pgs.
U.S. Office Action dated Dec. 12, 2007 from related U.S. Appl. No. 10/426,106, 12 pgs.
U.S. Office Action dated Apr. 29, 2008 from related U.S. Appl. No. 10/426,106, 15 pgs.
Notice of Allowance and Allowed Claims dated Jun. 24, 2008 from related U.S. Appl. No. 10/874,679, 27 pgs.
Notice of Allowance and Allowed Claims dated Jul. 14, 2008 from U.S. Appl. No. 10/321,080, 23 pgs.
Notice of Allowance and Allowed Claims dated Aug. 21, 2008 from corresponding U.S. Appl. No. 10/080,995, 15 pgs.
European Office Action mailed Aug. 20, 2008 from related EP Application No. 04750992.2, 5pgs.
Australian Office Action mailed Sep. 26, 2008 from related AU Application No. 2004234700, 2 pgs.
Notice of Allowance and Allowed Claims dated Oct. 31, 2008 from U.S. Appl. No. 10/426,106.
C. Perkins, Editor "IP Mobility Support," RFC 2002, IBM Corporation, Oct. 1996, 56 pgs.
Canadian Office Action mailed Jan. 6, 2009 from related CA Application No. 2,520,501, 5 pgs.
Chinese Office Action mailed Mar. 27, 2009 from related CN Application No. 200480010365.7, 5 pgs.
U.S. Office Action dated Jun. 2, 2006 from related U.S. Appl. No. 10/080,995, 15 pgs.
U.S. Office Action dated Nov. 24, 2006 from related U.S. Appl. No. 10/080,995, 10 pgs.
U.S. Office Action dated Feb. 9, 2007 from related U.S. Appl. No. 10/080,995,13 pgs.
U.S. Office Action dated Jul. 19, 2007 from related U.S. Appl. No. 10/080,995, 9 pgs.
U.S. Office Action dated Nov. 8, 2007 from related U.S. Appl. No. 10/080,995, 9 pgs.
Notice of Allowance and Allowed Claims dated Apr. 11, 2008 from U.S. Appl. No. 10/080,995, 18 pgs.
U.S. Office Action dated Jul. 1, 2011 from related U.S. Appl. No. 12/323,384.
Canadian Office Action mailed Jul. 9, 2011 from related CA Application No. 2,520,501.
U.S. Office Action dated Dec. 15, 2011 from related U.S. Appl. No. 12/323,384.

* cited by examiner

Client association table — 402

| SRC MAC address 1 |
| --- |
| SRC MAC address 2 |
| SRC MAC address 3 |
| SRC MAC address 4 |
| SRC MAC address 5 |
| SRC MAC address 6 |
| SRC MAC address 7 |
| • |
| • |
| • |

*FIG. 4*

Mapping table — 502

| SRC IP address 1 | SRC MAC address 1 |
| --- | --- |
| SRC IP address 2 | SRC MAC address 2 |
| • | • |

*FIG. 5*

Mobility binding table 602

| SRC IP address (Home address) 604 | SRC MAC address 606 | Care-of address 608 | Tunnel interface 610 |
|---|---|---|---|
|  |  |  |  |

FIG. 6

Visitor table 702

| SRC IP address (Home address) 704 | SRC MAC address 706 | Home Agent address 708 | Tunnel interface 710 |
|---|---|---|---|
|  |  |  |  |

FIG. 7

METHODS AND APPARATUS FOR SECURING PROXY MOBILE IP

RELATED APPLICATIONS

This application is a divisional application of patent application Ser. No. 10/426,106, entitled "Methods and Apparatus for Securing Proxy Mobile IP," filed on Apr. 28, 2003, by Leung et al, now U.S. Pat. No. 7,505,432, which is incorporated herein for all purposes.

BACKGROUND OF THE INVENTION

1. Field of the Invention

The present invention relates to Mobile IP network technology. More particularly, the present invention relates to authenticating the identity of a node during proxy registration performed on behalf of the node.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4. Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

It is often desirable to assign a unique IP address to each user or device within a network. Moreover various protocols enable automatic assignment of IP addresses within a particular network. For instance, in accordance with the Dynamic Host Configuration Protocol (DHCP), network administrators may manage a network centrally and automate the assignment of Internet Protocol (IP) addresses in an organization's network. More particularly, using the Internet's set of protocols (TCP/IP), each device that is capable of connecting to the Internet needs a unique IP address. When an organization sets up its computer users with a connection to the Internet, an IP address must be assigned to each machine. Without DHCP, the IP address must be entered manually at each computer and, if computers move to another location in another part of the network, a new IP address must be entered.

DHCP allows a network administrator to supervise and distribute IP addresses from a central point and automatically sends a new IP address when a computer is plugged into a different location within the network.

DHCP uses the concept of a "lease" or amount of time that a given IP address will be valid for a computer. The lease time can vary depending on how long a user is likely to require the Internet connection at a particular location. DHCP is particularly useful in education and other environments where users change frequently. Using very short leases, DHCP can dynamically reconfigure networks in which there are more computers than there are available IP addresses. Thus, DHCP supports static addresses for computers containing Web servers that need a permanent IP address.

Although DHCP functions in a static environment, the assignment of a new IP address each time a computer changes its location within a network is far from ideal within a mobile environment. More particularly, when a mobile node roams to a new location within a network, it would be desirable for the node to maintain its home address. However, provisions have not been made for a node that wishes to maintain a single IP address when it changes its location within a network using DHCP. Moreover, a node that is not mobile enabled cannot currently change its location within a network using DHCP and still maintain its assigned IP address.

It is possible to provide Internet services via a wireless link for mobile users who attach to a network via a connection such as a DHCP connection, even where the node does not support Mobile IP. Specifically, a proxy device may implement Mobile IP on behalf of a node that does not support Mobile IP functionality. One such proxy device is the access point (AP). An Access Point (AP) may be defined as the center point in an all-wireless network or serves as a connection point between a wired and a wireless network. Multiple APs can be placed throughout a facility to give users with WLAN adapters the ability to roam freely throughout an extended area while maintaining uninterrupted access to all network resources.

Patent application Ser. No. 10/080,995, entitled "METHODS AND APPARATUS FOR SUPPORTING PROXY MOBILE IP REGISTRATION IN A WIRELESS LOCAL AREA NETWORK," discloses a system for communicating subnet addresses of gateways (e.g., Home Agents) that support APs in the network. When an AP receives a data packet, the AP may compare the data packet (e.g., source address) with the AP information for one or more APs to determine whether to send a registration request on behalf of the node. More particularly, the AP determines from the source address whether the node is located on a subnet identical to a subnet of the AP. If the node is located on the subnet of the AP, no Mobile IP service is required on behalf of the node. However, when it is determined from the source address that the node is not located on the subnet identical to the subnet of the Access Point, the AP composes and sends a mobile IP registration request on behalf of the node. For instance, the mobile IP registration request may be composed using the gateway associated with the "home" AP (e.g., having a matching subnet) as the node's Home Agent.

Proxy Mobile IP allows clients to move between networks while maintaining sessions. This is accomplished through Mobile IP control messages such as those disclosed in application Ser. No. 10/080,995, entitled "METHODS AND APPARATUS FOR SUPPORTING PROXY MOBILE IP REGISTRATION IN A WIRELESS LOCAL AREA NETWORK," by inventors Wang et al, filed on Feb. 20, 2002. In this manner, even clients that do not support Mobile IP may move between networks while maintaining sessions.

As shown in FIG. 2, proxy Mobile IP is supported by multiple Access Points within a wireless Local Area Network (WLAN). In this example, two Access Points 202 and 204 support proxy Mobile IP for sub-network A. In this example, a DHCP server assigns an IP address on sub-network A to the node 205. One of the Access Points 202 and 204 detects whether the IP address of the node 205 is on a different sub-network. Since the IP address of the node 205 is on the same sub-network as the Access Points 202 and 204, proxy registration is not required since the node 205 is in its home network.

Alternatively, if the node 205 were on a different sub-network, a registration request would be composed on behalf of the client 205 and sent to the Foreign Agent. The registration request is then processed by the Foreign Agent, shown here as router 206, and subsequently by the client's Home Agent. Upon completion of registration of the node 205 with its Home Agent, packets addressed to the node 205 are then tunneled to node 205 by its Home Agent via the Foreign Agent and Access Point.

When the node 205 subsequently roams beyond the layer 3 boundary from sub-network A to sub-network B, one of the two Access Points 208 and 210 supporting proxy Mobile IP for sub-network B composes a registration request on behalf of the client 205 once it is determined that the IP address of the node 205 is on a different sub-network. The registration request is then processed by the Foreign Agent, shown here as router 212, and forwarded to the client's Home Agent. Upon completion of registration of the node 205 with its Home Agent, packets addressed to the node 205 are then tunneled to the node 205 by the node's Home Agent via the Foreign Agent and Access Point.

While proxy Mobile IP is advantageous since it allows non-Mobile IP enabled nodes to move while maintaining a session, this method is susceptible to route poisoning and Denial of Service (DoS) attacks. Specifically, another client may send packets with various source IP addresses and MAC addresses. When this second client sends a packet with another client's IP address, the network would then direct traffic to the IP address at the location of the second client because the Access Point would assume that the first client has moved.

In view of the above, it would be desirable if an authentication mechanism could be implemented to authenticate the identity of a client for which proxy Mobile IP registration is being performed.

SUMMARY OF THE INVENTION

An invention is disclosed that enables proxy Mobile IP registration to be performed in a secure manner. Various security mechanisms may be used independently, or in combination with one another, to authenticate the identity of a node during the registration process. This is accomplished, at least in part, by verifying and/or transmitting the MAC address assigned to the node in various steps in the registration process.

In accordance with one aspect of the invention, as a first security mechanism, an Access Point receiving a packet from a node verifies that the source MAC address identified in the packet is in the Access Point's client association table. After this security mechanism is satisfied, the Access Point may compose a registration request or require that further security mechanisms be satisfied prior to composing a registration request on behalf of the node.

In accordance with another aspect of the invention, as a second security mechanism, the Access Point ensures that a one-to-one mapping exists for the source MAC address and source IP address identified in the packet in a mapping table maintained by the Access Point. After this security mechanism is satisfied, the Access Point may compose a registration request packet. In other words, the Access Point may require that both the first and second security mechanisms be satisfied prior to composing a registration request packet on behalf of the node.

In accordance with yet another aspect of the invention, as a third mechanism, a binding is not modified in the mobility binding table maintained by the Home Agent unless there is a one-to-one mapping in the mobility binding table between the source MAC address and the source IP address. Similarly, the Foreign Agent may also maintain a mapping between the source IP address and the source MAC address in its visitor table to ensure a one-to-one mapping between a source IP address and the associated MAC address.

In accordance with yet another aspect of the invention, the MAC address is preferably transmitted in a MAC address extension to the registration request and registration reply packets. In this manner, the Access Point, Home Agent, and Foreign Agent may ascertain the node's MAC address and ensure a one-to-one mapping between the IP address and the MAC address during the registration process. Through the use of the above technique(s), the risk of route poisoning and Denial of Service (DoS) attacks is reduced.

BRIEF DESCRIPTION OF THE DRAWINGS

FIG. 4 is a diagram illustrating a client association table maintained by an Access Point in accordance with various embodiments of the invention.

FIG. 5 is a diagram illustrating a mapping table maintained by an Access Point in accordance with various embodiments of the invention.

FIG. 6 is a diagram illustrating an exemplary mobility binding table maintained by a Home Agent in accordance with various embodiments of the invention.

FIG. 7 is a diagram illustrating an exemplary visitor table maintained by a Foreign Agent in accordance with various embodiments of the invention.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

An invention is described herein that enables a node (e.g., a node that does not implement the Mobile IP protocol) to roam to various Foreign Agents within a network including a DHCP supported network. This is accomplished, in part, through the use of control messages sent between the access points within the network. For purposes of the following discussion, the term "mobile node" will be used to refer to a mobile node implementing the Mobile IP protocol while the term "node" will be used to refer to a node that does not implement the Mobile IP protocol.

Figure 1:
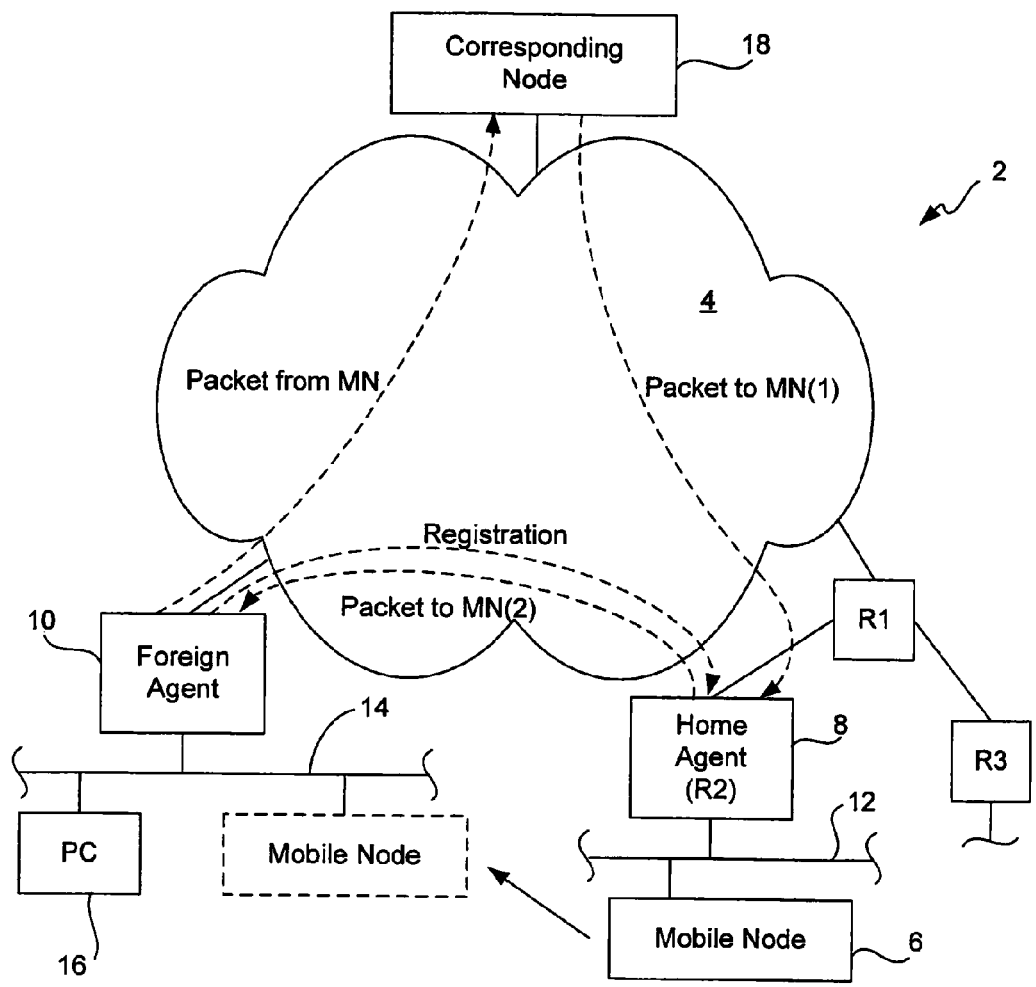
FIG. 1 is a diagram illustrating a Mobile IP network segment and associated environment.
Figure 2:
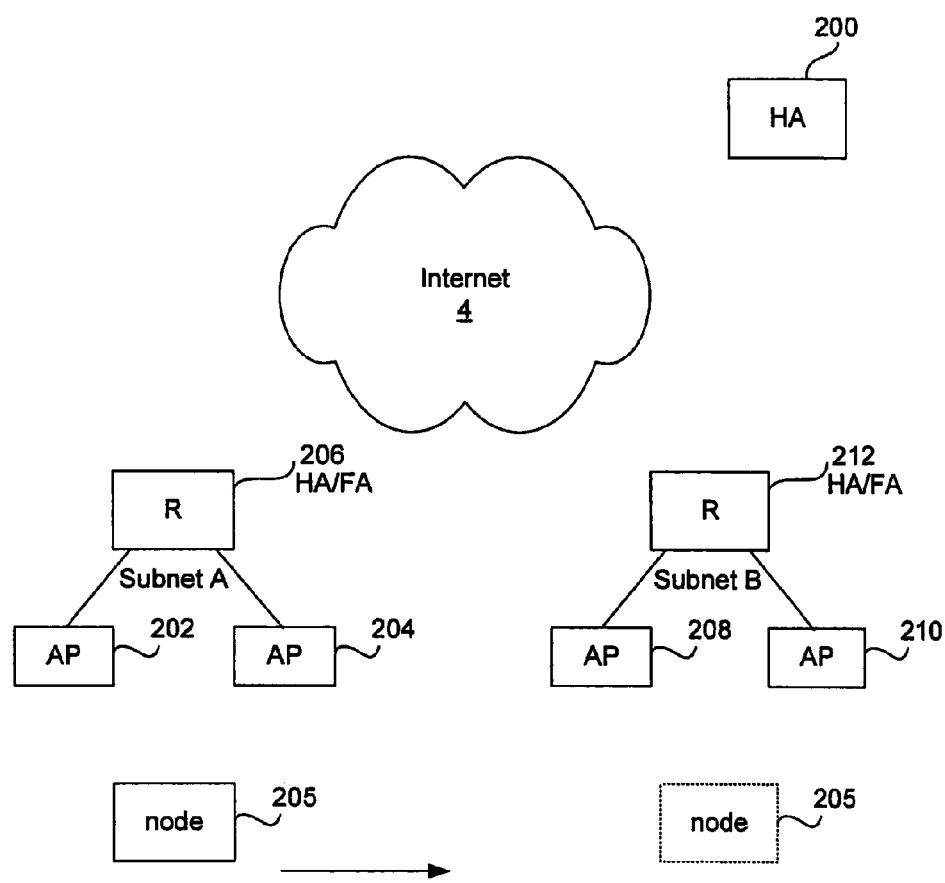
FIG. 2 is a block diagram illustrating a system in which proxy Mobile IP is supported.

FIG. 2 is a block diagram illustrating a system in which the present invention may be implemented. In the following description, the present invention is implemented in a wireless network. However, although the present invention is described as being implemented in a wireless network, the present invention may also be implemented in a non-wireless network. As shown, a node 205 may wish to roam from its Home Agent 200 to a first Foreign Agent 206. Similarly, once attached to the first Foreign Agent 206, the node 205 may again wish to roam to a second Foreign Agent 212. Although the node 205 may have an assigned IP address, when the node 205 roams, it is preferable for the node to maintain this assigned IP address. For instance, although a DHCP server typically dynamically assigns a new IP address to a node when its location within a network has changed, it is preferable to maintain the IP address originally assigned to the node by the DHCP server.

In a wireless network, Access Points 202, 204 and 208, 210 are coupled to the Foreign Agents 206 and 212 respectively. By way of example, in a wireless network, the Access Points 202, 204 and 208, 210 may have an antenna and receiver for receiving packets. As yet another example, the Access Points 202, 204 and 208, 210 may designate connection points in a non-wireless network. Typically, a mobile node implementing Mobile IP registers and de-registers with its Home Agent through the registration process. However, according to various embodiments of the invention disclosed in patent application Ser. No. 10/080,995, entitled "METHODS AND APPARATUS FOR SUPPORTING PROXY MOBILE IP REGISTRATION IN A WIRELESS LOCAL AREA NETWORK,", registration is initiated by the Access Point on behalf of the Mobile IP node. Similarly, de-registration may be initiated by the Access Point on behalf of the roaming node. For instance, node 205 that has roamed to the first Foreign Agent 206 is registered with the node's Home Agent 200 when the first Access Point 202 composes and sends a registration request packet via the first Foreign Agent 206. Thus, the first Foreign Agent's visitor table and the Home Agent's mobility binding table are updated to indicate that the node has roamed to the first Foreign Agent 206. When the node 205 roams to the second Foreign Agent 212, the node 205 is registered with the Home Agent via the second Foreign Agent 212 (e.g., by one of the Access Points 208, 210, the Foreign Agent 212 and/or the Home Agent 200). In other words, the first Foreign Agent 206 updates its visitor table to reflect the movement of the node 205. Similarly, the Home Agent's mobility binding table is updated to reflect the movement of the node 205 to the second Foreign Agent 212. Thus, the appropriate entry in the first Foreign Agent's visitor table and the Home Agent's mobility binding table may be deleted. A new entry is then entered in the Home Agent's mobility binding table and the second Foreign Agent's visitor table upon completion of registration of the mobile node with the Home Agent. Alternatively, the visitor table may be maintained and updated by the Access Point.

Figure 3:
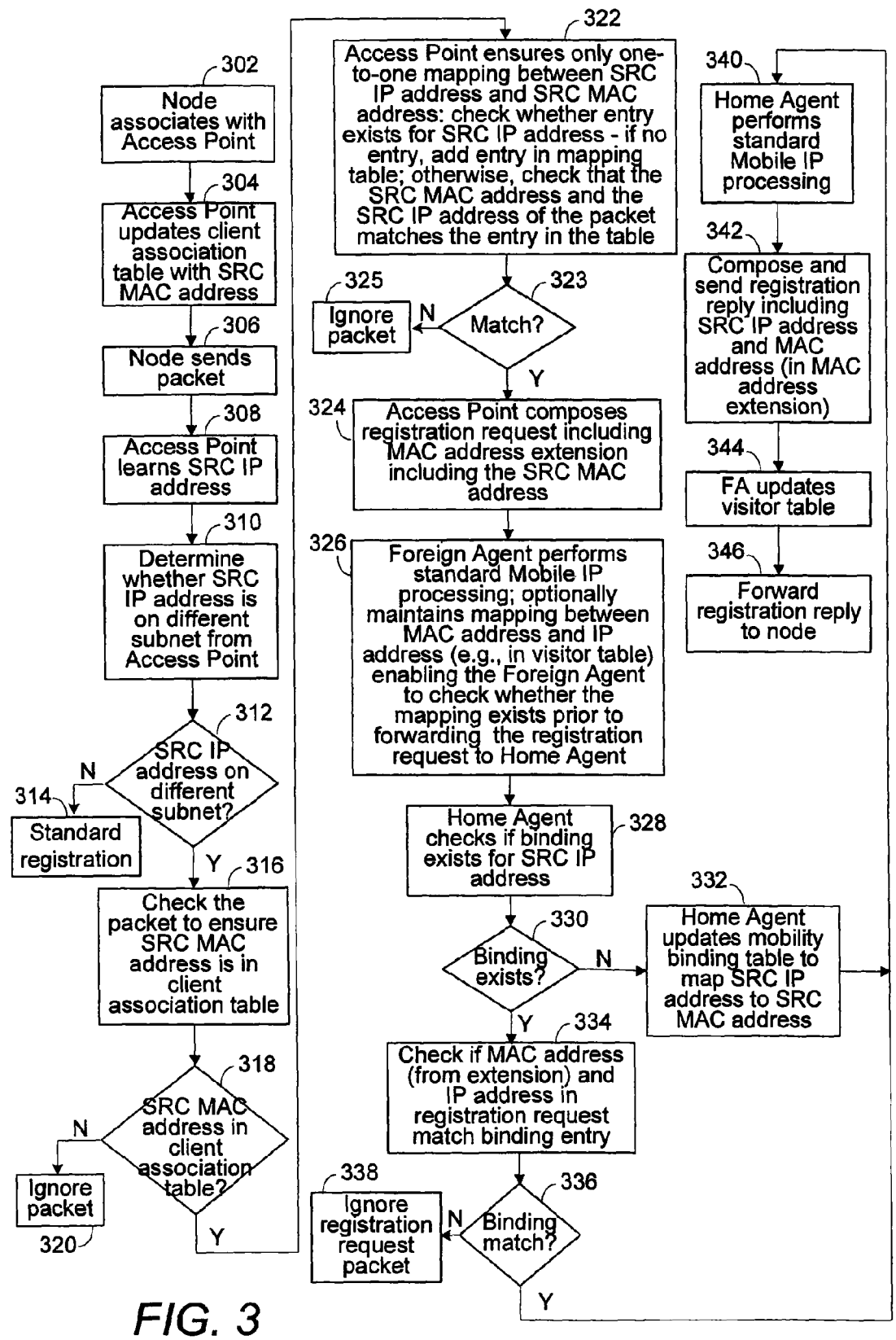
FIG. 3 is a process flow diagram illustrating a method of authenticating a client during the proxy registration process in accordance with various embodiments of the invention.

FIG. 3 is a process flow diagram illustrating a method of authenticating a client during the proxy registration process in accordance with various embodiments of the invention. As shown at block 302, the node associates with the Access Point. Specifically, when the node associates with the Access Point, the Access Point obtains the MAC address of the node. When a node wishes to connect with an Access Point, it first associates with the Access Point. Association is the process by which the node (e.g., including a wireless LAN card) informs the Access Point of the existence of the node (e.g., its MAC address) and its intention to connect to this Access Point. After association is completed, the node is connected to the Access Point, but may not be able to send data before authentication of the node. During association, the Access Point receives a packet from which the Access Point ascertains the MAC address. The Access Point then updates its client association table with the obtained source MAC address at block 304. When the node subsequently sends a packet including a source MAC address and a source IP address at block 306, the Access Point learns the source IP address of the node at block 308.

The Access Point may learn the IP and MAC address of the node through other mechanisms as well as from packets received by the Access Point. For instance, during Mobile IP authentication of the node, an IP address may be allocated to the node by an entity such as the Home Agent or Foreign Agent. During this authentication process, the Access Point may therefore learn the IP and MAC address. In another embodiment, the Access Point may listen to DHCP queries from the node from which the IP and MAC address are obtained.

In order to ascertain whether proxy Mobile IP service is required, the Access Point determines whether the source IP address is on a different subnet from the Access Point at block 310. If the source IP address is not on a different subnet as shown at block 312, standard registration pursuant to RFC 3440 is performed at block 314. Otherwise, the Access Point proceeds with the proxy registration process.

First, the Access Point determines whether the source MAC address from the packet is in its client association table at block 316. An exemplary client association table will be described in further detail below with reference to FIG. 4. If it is determined at block 318 that the source MAC address is not in the client association table, the packet will be ignored at block 320 and proxy registration will not be completed. In other words, packets will be dropped if it is determined that they are coming from an invalid source MAC address.

While this first security mechanism may be used on its own, it is preferably used in combination with a subsequent security mechanism, which ensures a one-to-one mapping between the source MAC address and the source IP address identified in the packet. Thus, as a second security mechanism, the Access Point checks at block 322 whether a mapping between the source IP address and the source MAC address exists in the Access Point's mapping table. An exemplary mapping table will be described in further detail below with reference to FIG. 5. Specifically, the Access Point may check whether an entry exists or the source IP address. If the mapping table does not include an entry for the source IP address, the mapping table is updated with a mapping between the source MAC address and the source IP address. However, if a mapping does exist for the source IP address, the Access Point checks that the source MAC address and the source IP address of the packet match the entry in the mapping table.

The first and second security mechanism may each be used alone to ensure that a registration request is sent on behalf of a valid node. However, as described above, the two security mechanisms are preferably used in combination with one another. Thus, once both security mechanisms have been satisfactorily passed as shown at block 323, the Access Point composes a registration request at block 324. The registration request preferably includes a MAC address extension including the source MAC address. An exemplary registration request will be described in further detail below with reference to FIG. 8. However, if the Access Point determines that the mapping table does not include an entry for the source IP address and the source MAC address identified in the packet, the packet is ignored at block 325, and a registration request is not composed.

Once a registration request is sent to the Foreign agent, the Foreign Agent performs standard Mobile IP processing at block 326. In addition, the Foreign Agent may also maintain a mapping table such as that illustrated in FIG. 5, either separately or in a visitor table such as that described below with reference to FIG. 7. In this manner, the Foreign Agent may check whether a mapping between an IP address and MAC address exists prior to forwarding the registration request to the Home Agent. In other words, if a mapping does not exist, the Foreign Agent may drop the registration request packet. For instance, if an entry includes the IP address but a different MAC address, the Foreign Agent may drop the registration request packet. This may be accomplished by searching for an entry including the IP address, and subsequently checking the entry to ascertain whether the entry includes the MAC address. This checking may be performed by the Foreign Agent instead of or in addition to the other security mechanisms described above with reference to the Access Point.

When the Home Agent receives the registration request packet at block 328, it updates its mobility binding table as necessary. An exemplary mobility binding table will be described in further detail below with reference to FIG. 6. In accordance with one embodiment, the Home Agent updates the mobility binding table with a mapping between the source IP address from the home address field of the registration request packet and the source MAC address from the MAC address extension of the registration request packet. Specifically, the Home Agent checks if a binding exists for the source IP address. If a binding does not exist at block 330, the Home Agent updates the mobility binding table at block 332 to map the source IP address and the source MAC address to the care-of address identified in the registration request packet (e.g., to correlate with the new location of the node). Alternatively, if a binding in the mobility binding table exists for the source IP address, the Home Agent may perform a security check as a third security mechanism at block 334 to ensure that the entry contains a mapping between the source IP address and the source MAC address. If the mapping does not match the source IP address and the source MAC address at block 336, the registration request packet may be ignored at block 338. Otherwise, the Home Agent performs standard Mobile IP processing at block 340 and composes a registration reply at block 342. The registration reply preferably includes a MAC address extension including the source MAC address. The registration reply is then sent to the care-of address (e.g., Foreign Agent). An exemplary registration reply will be described in further detail below with reference to FIG. 9.

When the Foreign Agent receives the registration reply at block 344, it updates its visitor table as appropriate. For instance, if registration is successful, the visitor table is updated such that the Home Agent address is associated with the source IP address as well as the source MAC address. An exemplary visitor table will be described in further detail below with reference to FIG. 7. The registration reply is then forwarded to the node via the Access Point at block 346.

Once registration is completed, packets may be forwarded to the node at its new location by the Home Agent. Specifically, the Home Agent will look up the destination IP address specified in the packet in the Home Agent's mobility binding table to ascertain the node's care-of address. The packet may then be forwarded to the source IP address via the packets care-of address.

FIG. 4 is a diagram illustrating a client association table maintained by an Access Point in accordance with various embodiments of the invention. A client association table 402 includes a plurality of entries 404, each of the entries identifying a source MAC address. In other words, the table functions as a list of MAC addresses which may be searched by the Access Point maintaining the list.

FIG. 5 is a diagram illustrating a mapping table maintained by an Access Point in accordance with various embodiments of the invention. Mapping table 502 maps a source IP address 504 to a source MAC address 506 in a single entry. In this manner, valid IP/MAC address pairs may be identified by an Access Point searching the table 502.

FIG. 6 is a diagram illustrating an exemplary mobility binding table maintained by a Home Agent in accordance with various embodiments of the invention. As shown, a mobility binding table 602 typically identifies the node via a node identifier such as its home address 604 (source IP address). In addition, the mobility binding table may also include the source MAC address 606 as identified in the MAC address extension of the registration request (and registration reply) packets. Each entry will also identify the care-of address 608 and tunnel interface 610.

FIG. 7 is a diagram illustrating an exemplary visitor table maintained by a Foreign Agent in accordance with various embodiments of the invention. As described above, the visitor table 702 typically includes a node identifier such as home address 704 (source IP address). In addition, the visitor table may also include the source MAC address 706 as identified in the MAC address extension of the registration reply packet. Each entry will also identify the Home Agent address 708 and tunnel interface 710.

Figure 8:
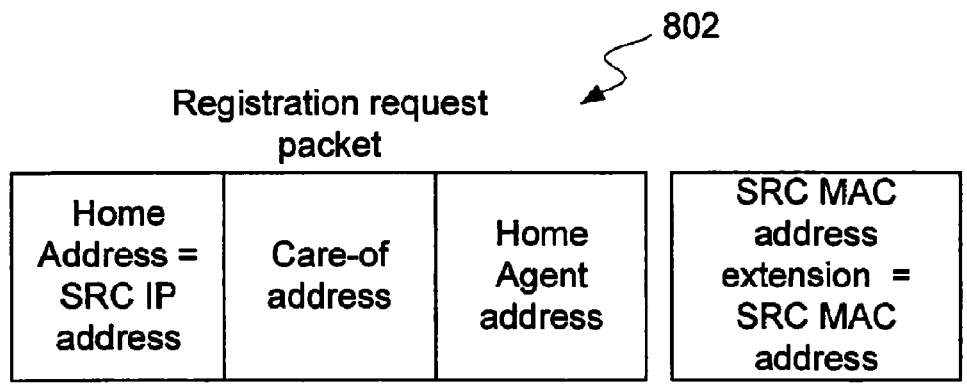
FIG. 8 is a diagram illustrating an exemplary registration request packet composed by an Access Point and transmitted in accordance with various embodiments of the invention.

FIG. 8 is a diagram illustrating an exemplary registration request packet composed by an Access Point and transmitted in accordance with various embodiments of the invention. Generally, the registration request packet 802 will include a Home Address field including the source IP address, care-of address field including the care-of address, and Home Agent address field including the Home Agent address. In addition, a MAC address extension will be appended to the registration request packet. The MAC address extension will include the source MAC address as obtained from the packet received from the node.

Figure 9:
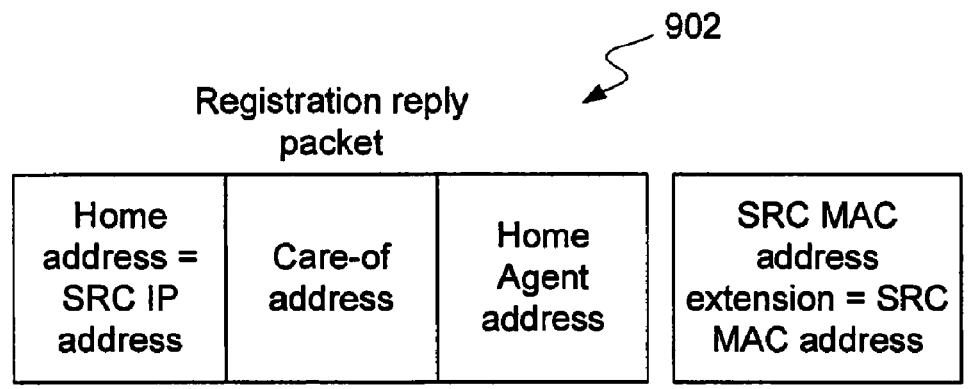
FIG. 9 is a diagram illustrating an exemplary registration reply packet composed by a Home Agent and transmitted in accordance with various embodiments of the invention.

FIG. 9 is a diagram illustrating an exemplary registration reply packet composed by a Home Agent and transmitted in accordance with various embodiments of the invention. The registration reply packet 902 includes a Home Address field including the source IP address, care-of address field including the care-of address, and Home Agent address field including the Home Agent address. In addition, a MAC address extension will be appended to the registration reply packet, enabling the Foreign Agent to update the visitor table with the information for node identified by the IP address and corresponding MAC address. The registration reply packet that is forwarded to the node need not include the MAC address extension.

Other Embodiments

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Access Points of this invention may be implemented in specially configured routers or servers, as well as Cisco Aironet Access Points, available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 10:
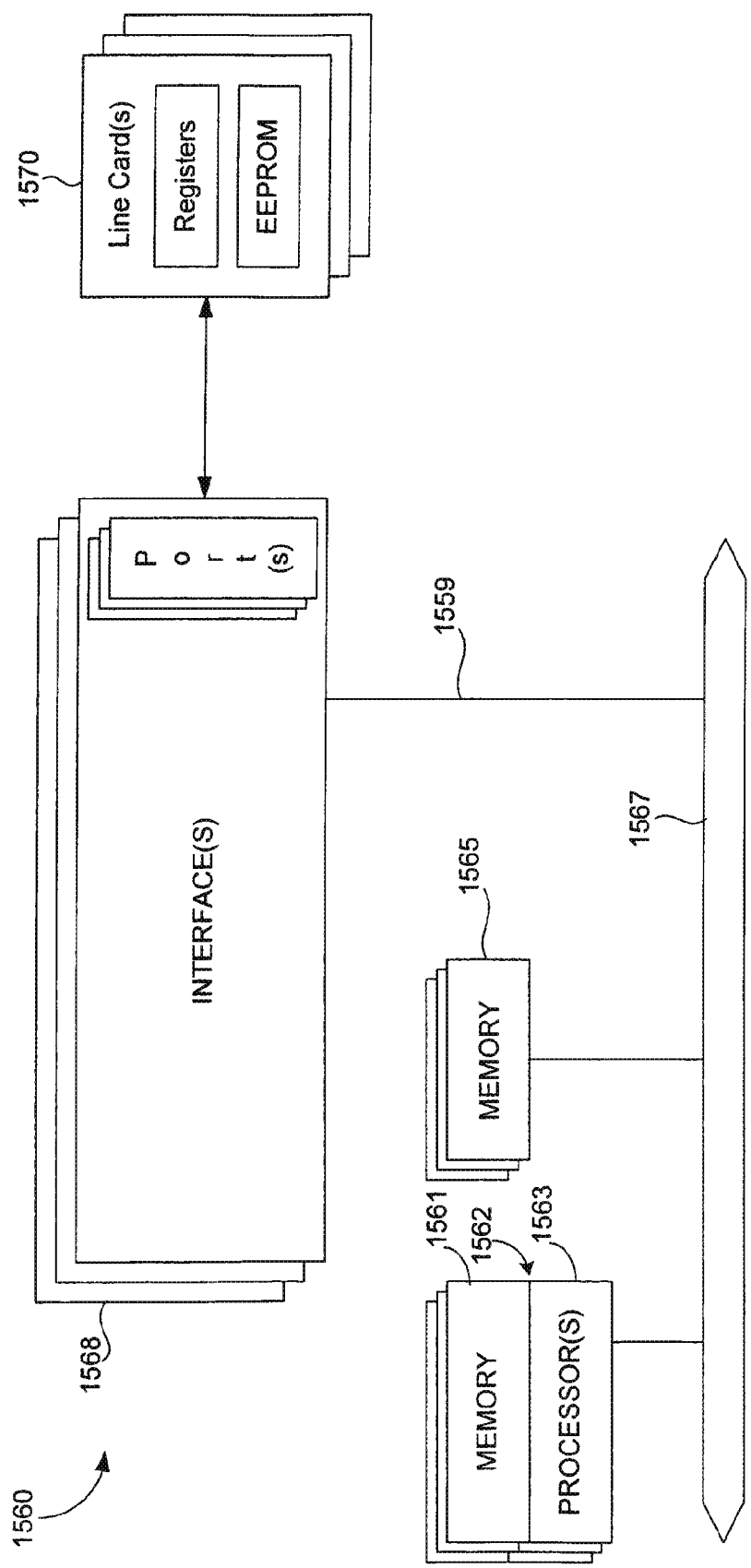
FIG. 10 is a block diagram of a network device that may be configured to implement aspects of the present invention.

Referring now to FIG. 10, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although not shown, various removable antennas may be used for further increase range and reliability of the access points. In addition, radio transmit power e.g., 1, 5, 20, 30, 50, and 100 mW) on the Cisco Aironet-Access Point Series is configurable to meet coverage requirements and minimize interference. In addition, a Cisco Aironet AP can be configured as a redundant hot standby to another AP in the same coverage area. The hot-standby AP continually monitors the primary AP on the same channel, and assumes its role in the rare case of a failure of the primary AP.

Although the system shown in FIG. 10 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described access points, other entities used to tunnel packets to mobile nodes on remote network segments can be used as well. For example, routers, bridges or other less intelligent packet switches may also employ the features of this invention. Moreover, although the present invention is useful for nodes that do not support Mobile IP, the invention may also be applicable for nodes that support Mobile IP. Accordingly, the present embodiments are to be considered as illustrative and not restrictive, and the invention is not to be limited to the details given herein, but may be modified within the scope and equivalents of the appended claims.

What is claimed is:

1. In an Access Point, a method of authenticating a node prior to performing proxy registration on behalf of the node, comprising:
   receiving a packet from the node, the packet including a source MAC address and a source IP address;
   ascertaining whether a one-to-one mapping between the source MAC address and the source IP address exists in a mapping table; and
   composing a registration request including a home address field including the source IP address and sending the registration request, thereby performing proxy registration on behalf of the node, wherein composing and sending the registration request are performed according to whether it is ascertained that the one-to-one mapping between the source MAC address and the source IP address exists in the mapping table.

2. The method as recited in claim 1, wherein composing the registration request comprises appending a MAC address extension to the registration request, the MAC address extension including the source MAC address.

3. An Access Point adapted for performing a method of authenticating a node prior to performing proxy registration on behalf of the node, comprising:
   a processor; and
   a memory, at least one of the processor and the memory being adapted for:
   receiving a packet from the node, the packet including a source MAC address and a source IP address;
   ascertaining whether a mapping between the source MAC address and the source IP address exists in a mapping table; and
   composing a registration request including a home address field including the source IP address and sending the registration request, thereby performing proxy registration on behalf of the node, wherein composing and sending the registration request are performed according to whether it is ascertained that the mapping between the source MAC address and the source IP address exists in the mapping table.

4. In a Foreign Agent, a method of processing a registration request, comprising:
   receiving a registration request having a home address field including a source IP address, a Home Agent field including a Home Agent address, and a MAC address extension including a source MAC address;
   determining whether an entry including the source IP address and the source MAC address is in a visitor table maintained by the Foreign Agent; and
   forwarding the registration request according to whether an entry in the visitor table maintained by the Foreign Agent includes the source IP address and the source MAC address.

5. The method as recited in claim 4, wherein determining whether the entry including the source IP address and the source MAC address is in the visitor table maintained by the Foreign Agent includes determining whether a one-to-one mapping exists between the source IP address and the source MAC address.

6. The method as recited in claim 5, wherein when the one-to-one mapping between the source IP address and the source MAC address does not exist in the visitor table, dropping the registration request without forwarding the registration request.

7. In a Home Agent, a method of processing a registration request, comprising:
receiving a registration request having a home address field including a source IP address, a care-of address field including a care-of address, and having a MAC address extension including a source MAC address; and
determining whether a one-to-one mapping between the source MAC address and the source IP address exists in a mobility binding table;
wherein registering the source IP address with the Home Agent, composing a registration reply and sending the registration reply to the care-of address are performed according to whether it is determined that a one-to-one mapping between the source MAC address and the source IP address exists in the mobility binding table.

8. The method as recited in claim 7, wherein composing a registration reply comprises:
composing a registration reply including a home address field including the source IP address, a care-of address field including the care-of address, and having a MAC address extension including the source MAC address.

9. In a Home Agent, a method of processing a registration request, comprising:
receiving a registration request having a home address field including a source IP address, a care-of address field including a care-of address, and having a MAC address extension including a source MAC address;
determining whether a mapping between the source MAC address and the source IP address exists in a mobility binding table;
updating the mobility binding table according to whether the mapping between the source MAC address and the source IP address exists in the mobility binding table;
composing a registration reply including a home address field including the source IP address, a care-of address field including the care-of address, and having a MAC address extension including the source MAC address; and
sending the registration reply to the care-of address.

10. The method as recited in claim 9, further comprising:
updating the mobility binding table with the mapping between the source MAC address and the source IP address such that the mapping is associated with the care-of address.

11. The method as recited in claim 10,
wherein composing and sending the registration reply to the care-of address are performed when it is determined that the mapping between the source MAC address and the source IP address exists in the mobility binding table.

12. The method as recited in claim 9, further comprising:
wherein composing and sending the registration reply to the care-of address are performed when it is determined that the mapping between the source MAC address and the source IP address exists in the mobility binding table.

13. The method as recited in claim 9, further comprising:
determining whether the source IP address matches a binding in the mobility binding table;
when the source IP address matches a binding in the mobility binding table, determining whether the binding maps the source MAC address to the source IP address; and
wherein composing and sending the registration reply to the care-of address is performed when it is determined that the binding maps the source MAC address to the source IP address.

14. The method as recited in claim 13, further comprising:
when the source IP address does not match the binding in the mobility binding table, updating the mobility binding table with a mapping between the source MAC address and the source IP address such that the mapping is associated with the care-of address.

15. In a Foreign Agent, a method of processing a registration request, comprising:
receiving a registration request having a home address field including a source IP address, a Home Agent field including a Home Agent address, and a MAC address extension including a source MAC address;
determining whether an entry including the source IP address and the source MAC address is in a visitor table maintained by the Foreign Agent; and
forwarding the registration request to the Home Agent address according to whether an entry including the source IP address and the source MAC address is determined to be in the visitor table maintained by the Foreign Agent.

16. The method as recited in claim 15, further comprising:
updating a visitor table such that the visitor table includes an entry that associates the source IP address and the source MAC address with the Home Agent address.

17. The method as recited in claim 16, wherein updating the visitor table is performed when the registration reply is received.

18. The method as recited in claim 15, further comprising:
determining whether an entry including the source IP address is in the visitor table;
when an entry including the source IP address is in the visitor table, determining whether the entry includes the source MAC address; and
when the entry is determined to include the source MAC address and the source IP address, forwarding the registration request to the Home Agent address.

19. The method as recited in claim 15, further comprising:
receiving a registration reply having a home address field including the source IP address, a Home Agent field including the Home Agent address, and a MAC address extension including the source MAC address; and
forwarding the registration reply to the source IP address.

20. The method as recited in claim 15, further comprising:
dropping the registration request when an entry including the source MAC address and the source IP address is determined not to be in the visitor table maintained by the Foreign Agent.

21. A Foreign Agent, comprising:
a processor; and
a memory, at least one of the processor and the memory being adapted for:
receiving a registration request having a home address field including a source IP address, a Home Agent field including a Home Agent address, and a MAC address extension including a source MAC address;
determining whether an entry including the source IP address and the source MAC address is in a visitor table maintained by the Foreign Agent; and
forwarding the registration request according to whether an entry in the visitor table maintained by the Foreign Agent includes the source IP address and the source MAC address.

22. A Home Agent, comprising:
a processor; and
a memory, at least one of the processor and the memory being adapted for:
receiving a registration request having a home address field including a source IP address, a care-of address field including a care-of address, and having a MAC address extension including a source MAC address; and determining whether a one-to-one mapping between the source MAC address and the source IP address exists in a mobility binding table;

wherein registering the source IP address with the Home Agent, composing a registration reply and sending the registration reply to the care-of address are performed according to whether it is determined that a one-to-one mapping between the source MAC address and the source IP address exists in the mobility binding table.

23. The Home Agent as recited in claim 22, wherein composing a registration reply comprises:

composing a registration reply including a home address field including the source IP address, a care-of address field including the care-of address, and having a MAC address extension including the source MAC address.

24. A Home Agent, comprising:
a processor; and
a memory, at least one of the processor and the memory being adapted for:

receiving a registration request having a home address field including a source IP address, a care-of address field including a care-of address, and having a MAC address extension including a source MAC address;

determining whether a mapping between the source MAC address and the source IP address exists in a mobility binding table;

updating the mobility binding table according to whether the mapping between the source MAC address and the source IP address exists in the mobility binding table;

composing a registration reply including a home address field including the source IP address, a care-of address field including the care-of address, and having a MAC address extension including the source MAC address; and sending the registration reply to the care-of address.

* * * * *